(12) United States Patent
Thomas et al.

(10) Patent No.: US 11,803,571 B2
(45) Date of Patent: Oct. 31, 2023

(54) TRANSFER OF SYNCHRONOUS AND ASYNCHRONOUS REPLICATION

(71) Applicant: HEWLETT PACKARD ENTERPRISE DEVELOPMENT LP, Houston, TX (US)

(72) Inventors: Deepak Thomas, Apex, NC (US); Mark Heuser, Durham, NC (US); Vinay Kumar Vijay Kumar, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 237 days.

(21) Appl. No.: 17/167,137

(22) Filed: Feb. 4, 2021

(65) Prior Publication Data
US 2022/0245172 A1 Aug. 4, 2022

(51) Int. Cl.
*G06F 16/27* (2019.01)

(52) U.S. Cl.
CPC ............ *G06F 16/275* (2019.01); *G06F 16/27* (2019.01); *G06F 16/273* (2019.01)

(58) Field of Classification Search
CPC ...... G06F 16/27; G06F 16/273; G06F 16/275; G06F 3/0655; G06F 3/067; G06F 11/1448; G06F 11/1464
See application file for complete search history.

(56) References Cited

U.S. PATENT DOCUMENTS

| | | |
|---|---|---|
| 5,588,147 A | 12/1996 | Neeman et al. |
| 7,512,638 B2 | 3/2009 | Jhaveri et al. |
| 7,778,963 B2 | 8/2010 | Novik et al. |
| 7,962,672 B1 | 6/2011 | Martin et al. |
| 8,060,776 B1 | 11/2011 | Schoenthal et al. |
| 8,566,290 B2 | 10/2013 | McDonald et al. |
| 8,806,274 B1 | 8/2014 | Chatterjee et al. |
| 8,850,145 B1 | 9/2014 | Haase et al. |
| 9,047,169 B1 | 6/2015 | Haase et al. |
| 9,235,595 B2 | 1/2016 | Wang et al. |
| 9,330,161 B2 | 5/2016 | D'Amato et al. |
| 9,471,579 B1 | 10/2016 | Natanzon |

(Continued)

FOREIGN PATENT DOCUMENTS

WO      2016/190870 A1    12/2016

OTHER PUBLICATIONS

Dell Technologies; "Dell EMC Unity: Replication Technologies"; Jul. 2020; 78 pages.

(Continued)

*Primary Examiner* — Marcin R Filipczyk
(74) *Attorney, Agent, or Firm* — Trop, Pruner & Hu, P.C.

(57) ABSTRACT

In some examples, a first storage system receives a transfer of a synchronous replication role and an asynchronous replication role of a second storage system to the first storage system, where in the synchronous replication role the second storage system is to synchronously replicate data to the first storage system, and in the asynchronous replication role the second storage system is to asynchronously replicate a first data storage object to a third storage system. The first storage system uses, at the first storage system, translation information to identify a second data storage object that the second storage system is to asynchronously replicate to the third storage system following the transfer.

18 Claims, 4 Drawing Sheets

(56) References Cited

U.S. PATENT DOCUMENTS

| | | | |
|---|---|---|---|
| 9,703,803 | B2 | 7/2017 | Bachar et al. |
| 10,324,813 | B2 | 6/2019 | Luo et al. |
| 10,769,172 | B2 | 9/2020 | Truong et al. |
| 2003/0135615 | A1 | 7/2003 | Wyatt |
| 2009/0106242 | A1 | 4/2009 | McGrew et al. |
| 2015/0256510 | A1 | 9/2015 | Cederbaum |
| 2016/0019284 | A1 | 1/2016 | Sankar |
| 2017/0316044 | A1 | 11/2017 | Mohan et al. |
| 2019/0303490 | A1 | 10/2019 | Chen et al. |
| 2020/0073771 | A1* | 3/2020 | Ward ............... G06F 11/2064 |
| 2020/0233581 | A1* | 7/2020 | Chen ............... G06F 3/0653 |
| 2022/0129152 | A1* | 4/2022 | Adams ............... G06F 3/061 |

OTHER PUBLICATIONS

Dell Technologies; "Overview": printed on Jan. 4, 2021 from webpage: https://www.delltechnologies.com/en-in/documentation/unity-family/unity-p-replication-config/01-unity-rep-br-overview.htm; 1 page.

Hewlett Packard Enterprise; Technical White Paper; "Disaster-Tolerant Solutions with HPE 3PAR Remote Copy"; Apr. 2019; 33 pages.

VMware, Inc., "Site Recovery Manager Technical Overview," Aug. 11, 2020, <https://core.vmware.com/sites/default/files/resource/site_recovery_manager_technical_overview_noindex.pdf> (29 pages).

Netapp, Inc., "NetApp FAS/V-Series Storage Replication Adapter 2.0.1 for Clustered Data Ontap," (Research Paper), available online at <https://library.netapp.com/ecm/ecm_download_file/ECMP1224502>, Jun. 2013, 35 pages.

O.T. Anderson et al., "Global Namespace for Files", IBM Systems Journal, vol. 43, Issue 4, Journal Article, 2004, pp. 702-722.

Wikipedia, "Universally unique identifier", available online at <https://en.wikipedia.org/w/index.php?title=Universally_unique_identifier&oldid=831934972>, Mar. 22, 2018, 9 pages.

* cited by examiner

TRANSFER OF SYNCHRONOUS AND ASYNCHRONOUS REPLICATION

BACKGROUND

A storage system can be used to store data. In some examples, to prevent loss of data stored at a first storage system due to faults or other issues, the data stored at the first storage system can be replicated to a second storage system. If the first storage system were to become inaccessible or unavailable for any reason, then the replicated data stored at the second storage system can be accessed.

BRIEF DESCRIPTION OF THE DRAWINGS

Some implementations of the present disclosure are described with respect to the following figures.

Figure 1:
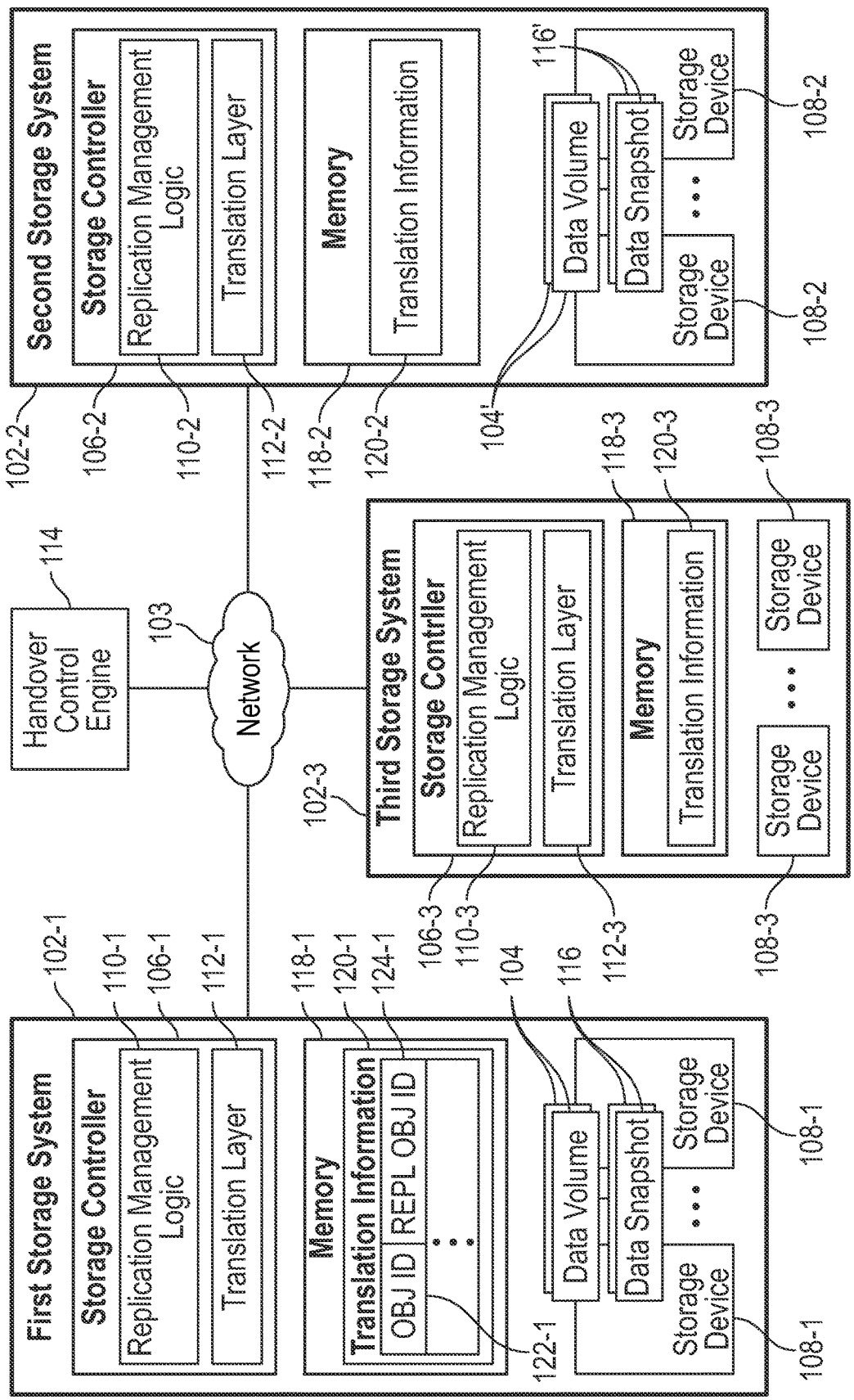
FIG. 1 is a block diagram of an arrangement that includes storage systems with which synchronous replication and asynchronous replication of data are performed, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Examples of storage systems include storage arrays, storage appliances, and so forth. A storage system can include a storage device, or alternatively, multiple storage devices. Examples of storage devices include disk-based storage devices, solid state drives, and/or other types of storage devices that are able to persistently store data. A storage device persistently stores data if the data stored in the storage device is maintained (i.e., not lost) even if power were removed from the storage device.

A storage system can store data in data volumes. A "data volume" refers to a logical collection of data. Logical data blocks can be written to a data volume, in response to write requests from a requester device over the network, such as a server computer, a desktop computer, a notebook computer, a tablet computer, a smartphone, or any other type of electronic device.

Data replication is a technique by which data stored at a source storage system is replicated (copied) to a destination storage system (or multiple destination storage systems). Data replication can include synchronous replication or asynchronous replication. With synchronous replication, data at the source storage system is maintained synchronized with data at the destination storage system. For example, when a write operation writes a given data (e.g., to a data volume) at the source storage system, the given data is replicated to the destination storage system. With synchronous replication, a write operation is considered to have successfully completed only if the given data is written to both the source storage system and the destination storage system. When synchronous replication is active, if the write operation were to successfully write the given data to the source storage system but is unable to successfully write a copy of the given data to the destination storage system, then the write operation is not considered to have successfully completed.

As another example, a snapshot of data taken at the source storage system can be synchronously replicated to the second storage system. A "snapshot of data" or "data snapshot" can refer to a point-in-time representation of data, such as a data volume, at a particular point in time. Thus, for a given data volume, a first data snapshot of the given data volume is taken at a first point in time, a second data snapshot of the given volume is taken at a second point in time, and so forth. The first data snapshot can include an entirety of the data in the given data volume, while the second data snapshot can include data that has been modified with respect to the first data snapshot (i.e., the second data snapshot stores the modified data but does not store any data of the first data snapshot that has not been modified since the first data snapshot was taken). More generally, any subsequent data snapshot after the first data snapshot contains just the delta data with respect to an immediately prior data snapshot, where "delta data" refers to data that is different between the successive data snapshots. A prior data snapshot is immediately prior to a later data snapshot if no intermediate data snapshot was taken between the prior data snapshot and a later data snapshot.

A data snapshot is an example of backup data generated for a given collection of data, such as a data volume. In other examples, other data backups can be employed for data volumes or other collections of data.

Asynchronous replication refers to replication that can be performed from a source storage system to a destination storage system asynchronously, i.e., a modified or new data at the first storage system can be copied to the destination storage system at a later point in time following the modification of data or creation of new data at the source storage system. Asynchronous replication can be performed at specified times (e.g., periodically or intermittently) or in response to other events. As an example, a data snapshot created at the source storage system can be asynchronously replicated to the destination storage system in response to a time event or another event.

In some cases, a source storage system can perform both synchronous replication of data and asynchronous replication of data for a collection of data volumes or another collection of data. In the ensuing discussion, reference is made to data replication performed for data volumes. More generally, data replication can be applied to any collection of data.

A first storage system can perform synchronous replication of data for a collection of data volumes (which includes a single data volume or multiple data volumes) to a second storage system. Additionally, the first storage system can perform asynchronous replication of data for the collection of data volumes to a third storage system that is different from the second storage system. For example, the first storage system can perform synchronous replication of a data snapshot (taken of a data volume in the collection of data volumes) to the second storage system, and asynchronous replication of the same data snapshot to the third storage system.

More generally, the first storage system can perform synchronous replication of data storage objects to the second storage system, and the first storage system can perform asynchronous replication of data storage objects to the third storage system. A "data storage object" can refer to a data volume or a data snapshot or any other unit of data.

In the foregoing example in which synchronous replication occurs from the first storage system to the second storage system and asynchronous replication occurs from the first storage system to the third a storage system, the first storage system can be referred to as a "leader" or "primary" storage system, and the second storage system can be referred to as a "partner" or "secondary" storage system. The partner or secondary storage system is the target of synchronous replication of data for a collection of data storage objects from the leader or primary storage system.

For asynchronous replication, the first storage system can be referred to as an "upstream" storage system and the third storage system can be referred to as a "downstream" storage system. An upstream storage system asynchronously replicates data for the collection of data storage objects to a downstream storage system.

The first storage system in the foregoing example has both a synchronous replication role and an asynchronous replication role.

In some cases, a handover process can be performed from the first storage system to the second storage system, where the handover process causes the second storage system to become the leader storage system for the collection of data storage objects. The handover process can be performed for various reasons. For example, maintenance of the first storage system can be performed, where the maintenance can include any or some combination of the following: upgrade machine-readable instructions (e.g., an operating system, firmware, etc.) of the first storage system, upgrade or replace a hardware component of the first storage system, and so forth. In other examples, the first storage system may experience an error or other fault that causes the first storage system to be inaccessible, unavailable, or unreliable, which may trigger the handover process In some examples, the handover process can cause the first storage system to transition from being a leader storage system to a partner storage system, such that the leader and partner roles of the first storage system and the second storage system are swapped. In other examples, the handover process can cause the second storage system to become the leader storage system, and another storage system (different from the first storage system) to become the partner storage system.

After performing the handover, the second storage system also becomes the upstream storage system for asynchronous replication to the third storage system (the downstream storage system). Prior to the handover, the second storage system may not be aware of the asynchronous replication that was occurring from the first storage system to the third storage system. After the handover, the second storage system takes over the role of the upstream storage system to asynchronously replicate data storage objects to the third storage system. A challenge of the second storage system taking over the asynchronous replication role for the first storage system is that the second storage system may not be aware of what data storage objects were already replicated to the third storage system, and thus, the second storage system may not be able to efficiently take over the asynchronous replication process. For example, if the second storage system is unaware of what data snapshots were already asynchronously replicated to the third storage system, then the second storage system may attempt to asynchronously replicate all data snapshots for a collection of data volumes to the third storage system, which may be wasteful of system resources.

Moreover, the first storage system and the second storage system may use different identifiers of data storage objects that are synchronously replicated from the first storage system to the second storage system. For a data storage object that is synchronously replicated from the first storage system to the second storage system prior to the handover process, the first storage system can employ a first identifier of the data storage object, while the second storage system can employ a different second identifier of the data storage object. Examples of identifiers of a data storage object can include any or some combination of the following: a unique identifier (UID), a name, an address, and so forth.

In the asynchronous replication session between the first storage system and the third storage system, the third storage system can use the same identifier of a data storage object used by the first storage system. Thus, because of different identifiers of the same data storage object used between the first and second storage systems, the second storage system may not be able to successfully interact with the third storage system to perform asynchronous replication of data storage objects.

In accordance with some implementations of the present disclosure, when handing over replication from a first storage system to a second storage system, both a synchronous replication role and an asynchronous replication role of the first storage system are transferred to a second storage system, and translation information is provided to identify a data storage object to asynchronously replicate from the second storage system to a third storage system following the transfer. In some examples, the transfer of both the synchronous replication role and the asynchronous replication role allows asynchronous replication to survive a failure or error at the first storage system, so that asynchronous replication of the latest data to the third storage system can be performed.

FIG. 1 is a block diagram of an example arrangement that includes a first storage system 102-1, a second storage system 102-2, and a third storage system 102-3. Although just three storage systems are shown in FIG. 1, in other examples, there may be more than three storage systems. The storage systems 102-1 to 102-3 are able to communicate with one another over a network 103, which can be a storage area network (SAN), a local area network (LAN), a wide area network (WAN), a public network (e.g., the Internet), and so forth.

Initially, the first storage system 102-1 is a leader storage system and the second storage system 102-2 is a partner storage system, where the first storage system 102-1 performs synchronous replication of data for a collection of data volumes 104 (a single data volume or multiple data volumes) to the second storage system 102-2. Also, initially, the first storage system 102-1 is an upstream storage system and the third storage system 102-3 is a downstream storage system, where the first storage system 102-1 performs asynchronous replication of data for the collection of data volumes 104 to the third storage system 102-3.

In some examples, a handover control engine 114 can perform a handover process from the first storage system 102-1 to the second storage system 102-2. The handover control engine 114 can interact with the storage systems 102-1 and 102-2 over the network 103. An "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

Although shown as being separate from the storage systems 102-1 to 102-3, the handover control engine 114 in other examples may be part of any or some combination of the storage systems 102-1 to 102-3. The handover process can be requested by a user, a program, or a machine.

In accordance with some implementations of the present disclosure, when performing the handover process from the first storage system 102-1 to the second storage system 102-2 such that the second storage system becomes the leader storage system, both the synchronous replication role and the asynchronous replication role of the first storage system 102-1 are transferred to the second storage system 102-2. Following the handover, the second storage system 102-2, as the leader storage system, performs both synchronous replication and asynchronous replication for a collection of data volumes 104', which is a copy (full copy or partial copy) of the collection of data volumes 104 at the first storage system 102-1.

The synchronous replication for the collection of data volumes 104' can be performed from the second storage system 102-2 to a partner storage system, which can be the first storage system 102-1 or a different storage system. After the handover, the second storage system 102-2 becomes the upstream storage system for asynchronous replication of data for the collection of data volumes 104' to the third storage system 102-3, which is the downstream storage system.

As examples, prior to the handover, the first storage system 102-1 performs synchronous replication of data snapshots 116 to the second storage system 102-2, and the first storage system 102-1 performs asynchronous replication of the data snapshots 116 to the third storage system 102-3. The data snapshots 116 are taken of data volume(s) of the collection of data volumes 104 at respective points in time.

After the handover, the second storage system 102-2 performs synchronous replication of data snapshots 116' to a partner storage system (e.g., 102-1), and the second storage system 102-2 performs asynchronous replication of the data snapshots 116' to the third storage system 102-3. Some of the data snapshots 116' may be copies of respective data snapshots 116 from the first storage system 102-1 (copied during the synchronous replication prior to the handover), and others of the data snapshots 116' are taken by the second storage system 102-2 of data volume(s) of the collection of data volumes 104' at respective points in time.

The first storage system 102-1 includes a storage controller 106-1, the second storage system 102-2 includes a storage controller 106-2, and the third storage system 102-3 includes a storage controller 106-3. A storage controller manages access (read or write) of data stored in a collection of storage devices of the respective storage system. A "collection" of storage devices can refer to a single storage device or multiple storage devices. The collection of data volumes 104 and the respective data snapshots 116 are stored on a collection of storage devices 108-1 of the first storage system 102-1. The collection of storage devices 108-1 can also store other types of data storage objects.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

The storage controller 106-1 can include a replication management logic 110-1 and a translation layer 112-1. The replication management logic 110-1 and the translation layer 112-1 can be implemented using a portion of the hardware processing circuit of the storage controller 106-1, or can be implemented as machine-readable instructions executed by the storage controller 106-1. The replication management logic 110-1 manages synchronous replication and asynchronous replication of data for the collection of data volumes 104.

As discussed further below, the translation layer 112-1 manages the translation of identifiers of data storage objects (e.g., data volumes, data snapshots, etc.) stored by the first storage system 102-1.

The first storage system 102-1 also includes a memory 118-1. A memory can include a memory device or multiple memory devices. A memory device can be implemented with any or some combination of the following: a volatile memory device such as a dynamic random access memory (DRAM) device, a static random access memory (SRAM) device, and so forth. Alternatively, or additionally, the memory 118-1 can include a nonvolatile memory device, such as a flash memory device or another type of nonvolatile memory device.

The memory 118-1 can store translation information 120-1 that is used by the translation layer 112-1 to translate between identifiers of data storage objects.

In some examples, the translation information 120-1 can include mapping information that maps local object identifiers 122-1 (OBJ ID) of data storage objects that are used by the first storage system 102-1 to respective replication object identifiers 124-1 (REPL OBJ ID).

An example of the translation information 120-1 is set forth in Table 1 below.

TABLE 1

| VOLUME ID 1 | REPL VOLUME ID A |
| SNAPSHOT ID 2 | REPL SNAPSHOT ID B |
| SNAPSHOT ID 3 | REPL SNAPSHOT ID C |
| ... | ... |
| VOLUME ID 25 | REPL VOLUME ID P |
| SNAPSHOT ID 45 | REPL SNAPSHOT ID T |

Table 1 above maps various local object identifiers of data storage objects, including volumes and snapshots, to respective replication object identifiers. Although the example of Table 1 lists identifiers of data volumes and data snapshots, it is noted that there can be identifiers of other types of data storage objects, such as branches, and so forth.

For example, a local object identifier of a given data volume (e.g., VOLUME ID 1) at the first storage system 102-1 can be mapped by the translation information 120-1 to a replication object identifier of the given data volume (e.g., REPL VOLUME ID A). As another example, a local object identifier of a given data snapshot (e.g., SNAPSHOT ID 45)

at the first storage system 102-1 can be mapped by the translation information 120-1 to a replication object identifier of the given data snapshot (e.g., REPL VOLUME ID T).

More generally, the translation information 120-1 includes multiple mapping entries, where each mapping entry of the translation information 120-1 maps a local object identifier of a respective data storage object to a replication object identifier of the respective data storage object.

In some examples, a replication object identifier refers to an intermediate object identifier that is common for the respective data storage object across multiple storage systems. Any given storage system can use a replication object identifier to derive, using the respective translation information at the given storage system, a corresponding local object identifier of the respective data storage object that is used by the given storage system. For example, during synchronous replication of a particular data storage object, the first storage system 102-1 translates (using the translation information 120-1) the local object identifier of the particular data storage object used at the first storage system 102-1 to a replication object identifier, and the first storage system 102-1 provides the replication object identifier of the particular data storage object to the second storage system 102-2. A translation layer 112-2 of the second storage system 102-2 translates the replication object identifier of the particular data storage object to a local object identifier of the particular data storage object used by the second storage system 102-2. When a new data storage object along with metadata for the new data storage object is received by the second storage system 102-2, the translation layer 112-2 can add, to translation information 120-2 stored in a memory 118-2 of the second storage system 102-2), a mapping entry that maps between the replication object identifier of the new data storage object to a local object identifier of the new data storage object used by the second storage system 102-2.

Generally, between two storage systems, data storage object identifier translation occurs as a two-step process. First, an initiator storage system that initiates a data replication (whether synchronous replication or asynchronous replication) uses the translation layer of the initiator storage system to translate from a local object identifier of a data storage object used at the initiator storage system to a corresponding replication object identifier. At the target storage system that is the target of the data replication, the translation layer at the target storage system is used to translate the replication object identifier received from the initiator storage system to a local object identifier of a data storage object used at the target storage system.

The storage controller 106-2 of the second storage system 102-2 similarly includes a replication management logic 110-2 and the translation layer 112-2. The second storage system 102-2 includes a collection of storage devices 108-2 to store the collection of data volumes 104' and the data snapshots 116' (and/or other data storage objects).

Similarly, the storage controller 106-3 of the third storage system 102-3 includes a replication management logic 110-3 and a translation layer 112-3. The third storage system 102-3 further includes a memory 118-3 that stores translation information 120-3. The third storage system 102-3 includes a collection of storage devices 108-3 to store data volumes and data snapshots (and/or other data storage objects) (not shown).

In accordance with some implementations of the present disclosure, after a handover from the first storage system 102-1 to the second storage system 102-2, the second storage system 102-2 (as the newly designated upstream storage system due to the handover from the first storage system 102-1) uses the translation information 120-2 to identify data storage objects, including data snapshots 116, that are already present at the third storage system 102-3. These identified data storage objects include data storage objects asynchronously replicated from the first storage system 102-1 to the third storage system 102-3.

Figure 2:
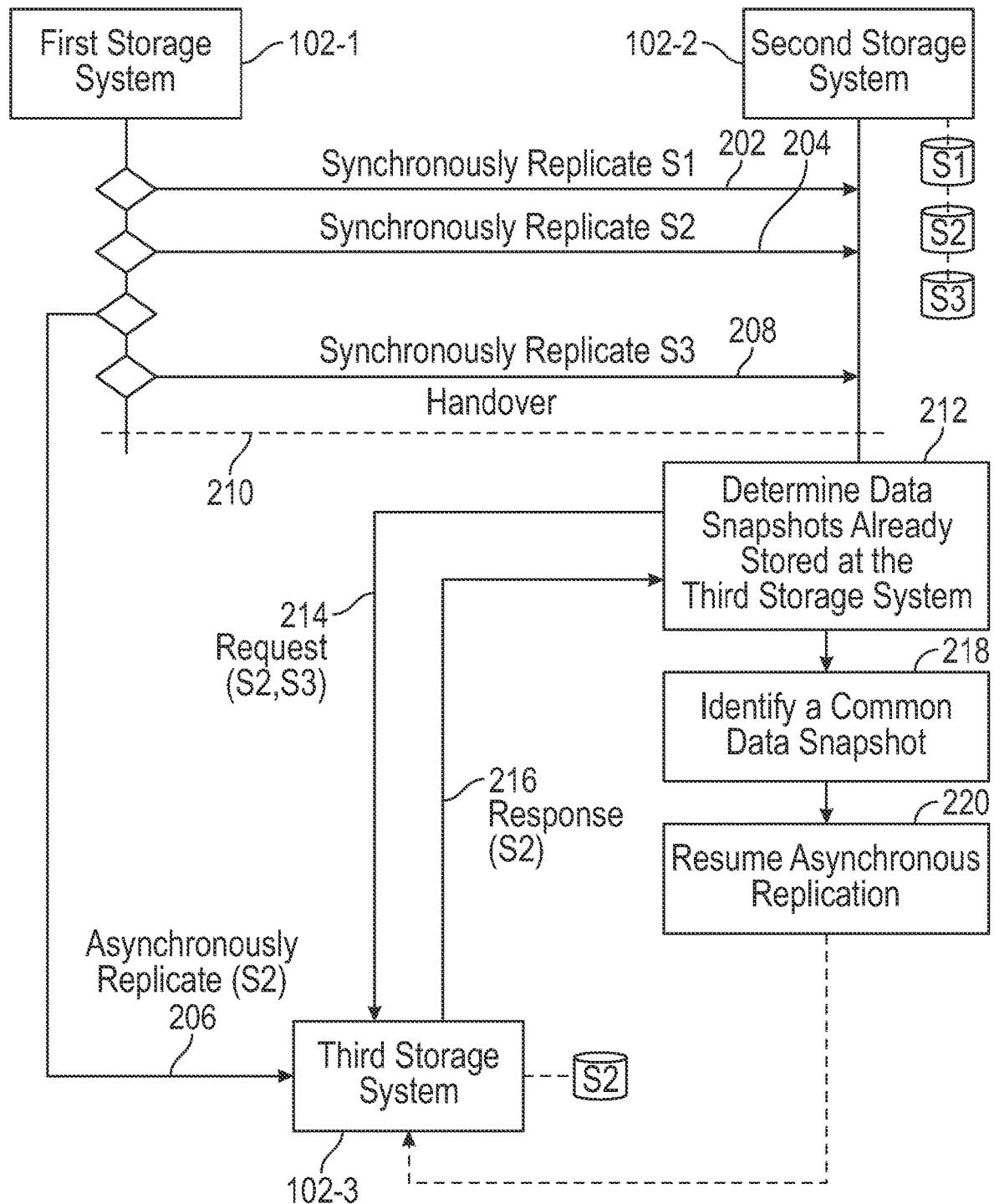
FIG. 2 is a flow diagram of a data replication process according to some examples.

FIG. 2 is a flow diagram of a process that involves the first storage system 102-1, the second storage system 102-2, and the third storage system 102-3, according to some examples.

The first storage system 102-1 is initially a leader storage system that synchronously replicates data storage objects to the second storage system 102-2, and the first storage system 102-1 is initially an upstream storage system that asynchronously replicates data storage objects to the third storage system 102-3. In the ensuing discussion, it is assumed that the data storage objects that are synchronously and asynchronously replicated include data snapshots. In other examples, other types of data storage objects can be replicated.

The first storage system 102-1 synchronously replicates (at 202) a data snapshot S1 of a data volume to the second storage system 102-2. In the example of FIG. 2, it is assumed that data snapshot S1 is not to be asynchronously replicated to the third storage system 102-3. Metadata sent by the first storage system 102-1 to the second storage system 102-2 for data snapshot S1 can include a replication object identifier of data snapshot S1, where the replication object identifier is derived by the translation layer 112-1 based on the translation information 120-1 (FIG. 1). The metadata can also include information indicating that data snapshot S1 is not to be asynchronously replicated, and other information. Upon receipt of data snapshot S1 from the first storage system 102-2, the translation layer 112-2 of the second storage system 102-2 can generate a local object identifier of data snapshot S1, and can add a mapping entry that maps the local object identifier of data snapshot S1 to the replication object identifier of data snapshot S1.

At a later time after the first storage system 102-1 takes a data snapshot S2 of a data volume, the first storage system 102-1 synchronously replicates (at 204) data snapshot S2 to the second storage system 102-2. The first storage system 102-1 can also send metadata for data snapshot S2 to the second storage system 102-2. Assuming that data snapshot S2 is to be asynchronously replicated to the third storage system 102-3, the metadata for data snapshot S2 can include a replication object identifier of data snapshot S2, information identifying a downstream storage system for asynchronous replication of data snapshot S2 (which can be the third storage system 102-3), and other information.

In response to an event (a timing event or another event), the first storage system 102-1 asynchronously replicates (at 206) data snapshot S2 to the third storage system 102-3).

At a later time after the first storage system 102-1 takes a data snapshot S3 of a data volume, the first storage system 102-1 synchronously replicates (at 208) data snapshot S3 to the second storage system 102-2. The metadata for data snapshot S3 sent by the first storage system 102-1 to the second storage system 102-2 can include replication object identifier of data snapshot S3, information identifying a downstream storage system for asynchronous replication of data snapshot S3 (which can be the third storage system 102-3), and other information, After the synchronous replication (at 204) and asynchronous replication (at 206) of data snapshot S2, and after the synchronous replication of data snapshot S3 to the second storage system 102-2 but before the asynchronous replication of data snapshot S3 to the third storage system 102-3, a handover is performed (at 210) from the first storage system 102-1 to the second storage system 102-2.

The asynchronous replication of data snapshot S3 was pending when the handover (at 210) occurred. The first storage system 102-1 is unable to perform the pending asynchronous replication of data snapshot S3 after the handover. After the handover, the second storage system 102-2 takes over as both a leader storage system for synchronous replication as well as an upstream storage system for asynchronous replication.

The target of the synchronous replication by the second storage system 102-2 can be the first storage system 102-1, or a different storage system. The target of the asynchronous replication by the second storage system 102-2 is the third storage system 102-3 (as indicated by metadata sent with data snapshots S2 and S3 from the first storage system 102-1 to the second storage system 102-2).

After the handover (at 210), the second storage system 102-2 stores data snapshots S1, S2, and S3, while the third storage system 102-3 stores data snapshot S2.

The second storage system 102-2 determines (at 212) data snapshots (to be asynchronously replicated) that are already stored at the third storage system 102-3. Data snapshots that are to be asynchronously replicated are referred to as "asynchronous replication" data snapshots, which in the example of FIG. 2 are data snapshots S2 and S3. Note that data snapshot S1 is not an asynchronous replication data snapshot since it is not to be asynchronously replicated.

In some examples, to make the determination (at 212), the second storage system 102-2 can generate information identifying asynchronous replication data snapshots that are stored at the second storage system 102-2. In the example of FIG. 2, such asynchronous replication data snapshots include data snapshots S2 and S3, which were synchronously replicated from the first storage system 102-1 to the second storage system 102-2 prior to the handover (at 210). The information can be in the form of a list of identifiers of the asynchronous replication data snapshots at the second storage system 102-2.

The second storage system 102-2 can send the information identifying the asynchronous replication data snapshots (e.g., S2 and S3 in FIG. 2) at the second storage system 102-2 to the third storage system 102-3, where this information can be sent as part of a request (at 214) that the third storage system 102-3 respond with an indication of whether or not any of the asynchronous replication data snapshots are stored at the third storage system 102-3.

Note that the data snapshots at the storage system 102-2 have local object identifiers that differ from local object identifiers used by the third storage system 102-3, since the third storage system 102-3 uses local object identifiers of the data snapshots used by the first storage system 102-1, for example. Thus, prior to sending the information identifying the asynchronous replication data snapshots, the second storage system 102-2 (and more specifically, the translation layer 112-2) uses the translation information 120-2 to translate from local object identifiers of the asynchronous replication data snapshots at the second storage system 102-2 to replication object identifiers. The replication object identifiers of the asynchronous replication data snapshots (e.g., S2 and S3) are sent in the request (at 214) to the third storage system 102-3. The third storage system 102-3 (and more specifically the translation layer 112-3) attempts to use the translation information 120-3 to translate from the replication identifiers of the asynchronous replication data snapshots to corresponding local object identifiers of the asynchronous replication data snapshots.

Note that the translation information 120-3 stored in the memory 118-3 of the third storage system 102-3 includes a mapping entry for data snapshot S2, but not S3. As a result, the third storage system 102-3 determines that it has data snapshot S2 but not data snapshot S3.

The third storage system 102-3 sends a response (at 216) to the second storage system 102-2 with an indication of which (if any) of the asynchronous replication data snapshots identified by the request (at 214) are stored in the third storage system 102-3. In the example of FIG. 2, the response (at 216) can include an indication that data snapshot S2 is stored at the third storage system 102-3. For example, the response (at 216) can include a replication object identifier of data snapshot S2.

Based on the response (at 216) from the first storage system 102-3, the second storage system 102-2 can identify (at 218) a common asynchronous replication data snapshot that resides at both the second storage system 102-2 and the third storage system 102-3. In the example of FIG. 2, the common asynchronous replication data snapshot is S2.

Figure 3:
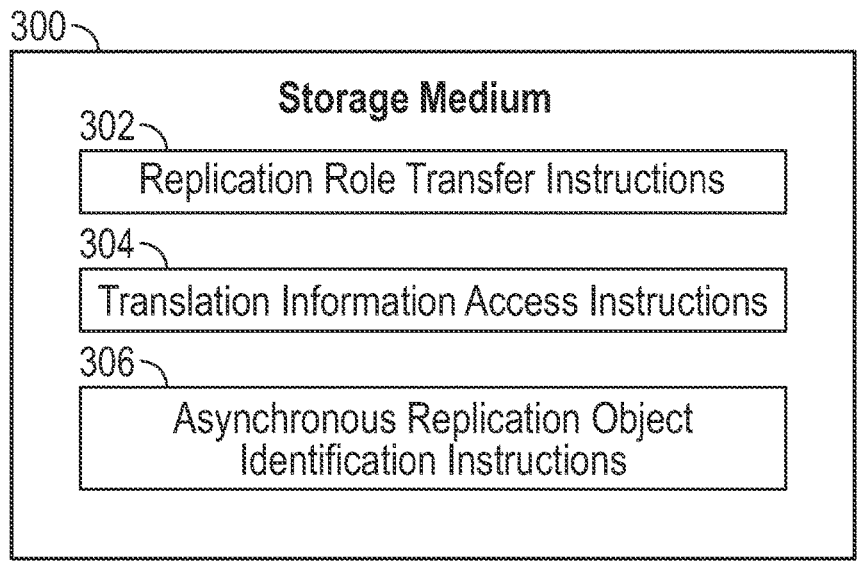
FIG. 3 is a block diagram of a storage medium storing machine-readable instructions according to some examples.

The second storage system 102-2 can resume (at 220) asynchronous replication of data snapshots starting with a data snapshot taken after the common data snapshot. In the example of FIG. 3, the next data snapshot to be asynchronously replicated by the second storage system 102-2 to the third storage system 102-3 is S3. Note that the second storage system 102-2 may also take data snapshots, which can also be asynchronously replicated to the third storage system 102-3.

FIG. 3 is a block diagram of a non-transitory machine-readable or computer-readable storage medium 300 storing machine-readable instructions that upon execution cause a first storage system (e.g., 102-2 in FIG. 1) to perform various tasks.

The machine-readable instructions include replication role transfer instructions 302 to receive a transfer of a synchronous replication role and an asynchronous replication role of a second storage system (e.g., 102-1 in FIG. 1) to the first storage system. In the synchronous replication role the second storage system is to synchronously replicate data to the first storage system, and in the asynchronous replication role the second storage system is to asynchronously replicate a first data storage object to a third storage system (e.g., 102-3 in FIG. 1).

The machine-readable instructions include translation information access instructions 304 to access translation information that translates between a first identifier of the first data storage object used by the first storage system and a different second identifier (e.g., a replacement object identifier or intermediate identifier) of the first data storage object.

The machine-readable instructions include asynchronous replication object identification instructions 306 to use, at the first storage system, the translation information to identify a second data storage object that the second storage system is to asynchronously replicate to the third storage system following the transfer.

In some examples, the second data storage object is a copy of the first data storage object synchronously replicated from the second storage system to the first storage system prior to the transfer.

In further examples, the second data storage object is generated at the first storage system (e.g., a data snapshot of a data volume taken at the first storage system after the transfer).

In some examples, the transfer of the synchronous replication role and the asynchronous replication role of the second storage system to the first storage system is part of a handover process to designate the first storage system as a leader storage system for performing a synchronous replication and an upstream storage system for performing an asynchronous replication. In some examples, the handover process designates the second storage system as a partner storage system for the synchronous replication from the first storage system following the transfer.

In some examples, the machine-readable instructions upon execution cause the first storage system to use the translation information to determine that a third data storage object was previously replicated to the third storage system from the second storage system, and to determine to resume an asynchronous replication of data storage objects from the first storage system to the third storage system starting from a data storage object created after the third data storage object that was previously replicated to the third storage system.

In some examples, the machine-readable instructions upon execution cause the first storage system to determine to not asynchronously replicate the third data storage object to the third storage system based on determining that the third data storage object was previously replicated to the third storage system.

In some examples, the machine-readable instructions upon execution cause the first storage system to send, to the third storage system, information identifying data storage objects at the first storage system, and receive, from the third storage system, an indication of whether any of the data storage objects identified by the information is stored at the third storage system. The determining that the third data storage object was previously replicated to the third storage system is based on the indication.

In some examples, the machine-readable instructions upon execution cause the first storage system to, as part of asynchronously replicating the second data storage object from the first storage system to the third storage system translate, at the first storage system using the translation information, an identifier of the second data storage object used at the first storage system to an intermediate identifier, and send the intermediate identifier to the third storage system. The intermediate identifier is useable at the third storage system to translate the intermediate identifier to an identifier of the second data storage object used at the third storage system, where the identifier of the second data storage object used at the first storage system is different from the identifier of the second data storage object used at the third storage system.

Figure 4:
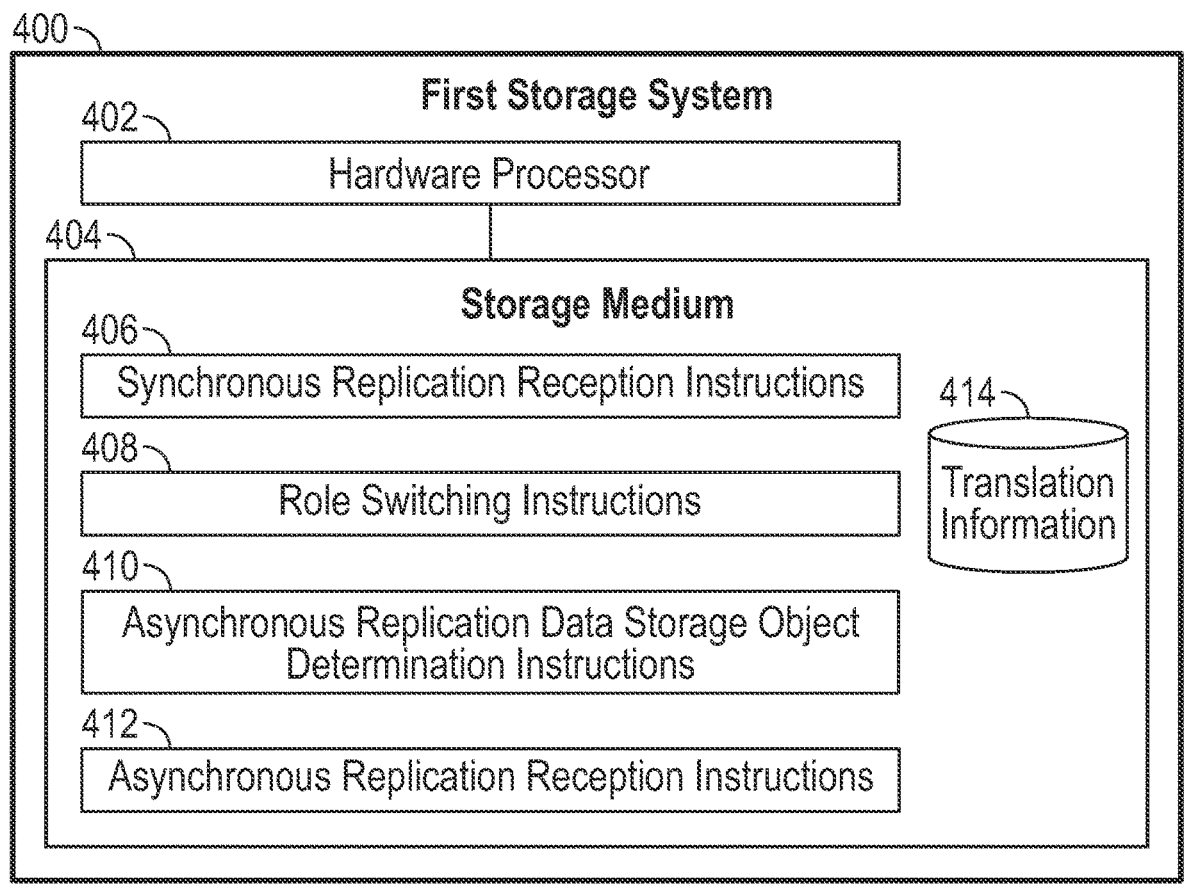
FIG. 4 is a block diagram of a storage system according to some examples.

FIG. 4 is a block diagram of a first storage system 400 (e.g., 102-2 in FIG. 1) that includes a hardware processor 402 (or multiple hardware processors). A hardware processor can include a microprocessor, a core of a multi-core microprocessor, a microcontroller, a programmable integrated circuit, a programmable gate array, or another hardware processing circuit.

The first storage system 400 includes a storage medium 404 storing machine-readable instructions executable on the hardware processor 402 to perform various tasks. Machine-readable instructions executable on a hardware processor can refer to the instructions executable on a single hardware processor or the instructions executable on multiple hardware processors.

The machine-readable instructions include synchronous replication reception instructions 406 to, while the first storage system 400 has a partner role for a second storage system (e.g., 102-1 in FIG. 1) having a leader role, receive a synchronous replication of a first data storage object from the second storage system.

The machine-readable instructions include role switching instructions 408, asynchronous replication data storage object determination instructions 410, and asynchronous replication resumption instructions 412 that are executed on the hardware processor 402 responsive to a handover process.

The role switching instructions 408 are executable to switch the first storage system 400 from the partner role to the leader role.

The asynchronous replication data storage object determination instructions 410 are executable to determine, using translation information 414, that a second data storage object was previously asynchronously replicated from the second storage system having the leader role to a third storage system (e.g., 102-3 in FIG. 1).

The asynchronous replication resumption instructions 412 are executable to, in response to the determining, resume an asynchronous replication of data storage objects including the first data storage object to the third storage system.

In some examples, prior to the handover process the first storage system 400 is to perform an asynchronous replication of data storage objects to the third storage system.

In some examples, the handover process is initiated for maintenance (e.g., upgrade machine-readable instructions or upgrade/replace a hardware component) or repair of the second storage system (e.g., to address a fault or error).

In some examples, the first storage system 400 is to, in association with the synchronous replication, receive metadata for the first data storage object, where the metadata includes information indicating that asynchronous replication is to be performed for the first data storage object.

Figure 5:
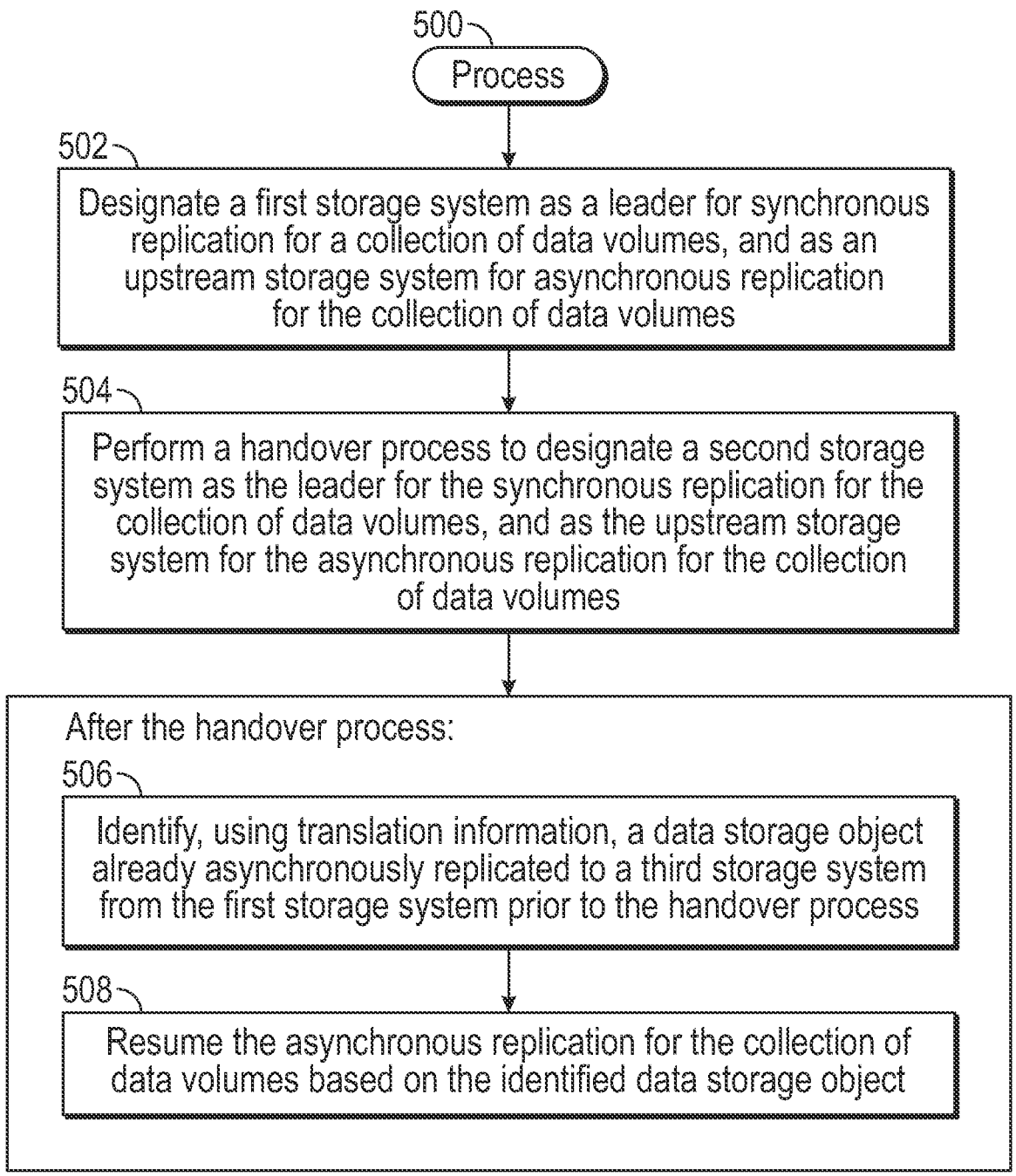
FIG. 5 is a flow diagram of a process according to some examples.

FIG. 5 is a flow diagram of a process 500 according to some examples. The process 500 includes designating (at 502) a first storage system (e.g., 102-1 in FIG. 1) as a leader for synchronous replication for a collection of data volumes, and as an upstream storage system for asynchronous replication for the collection of data volumes. The designating can be performed by the storage controller of the first storage system or by another computer.

The process 500 includes performing (at 504) a handover process to designate a second storage system (e.g., 102-2 in FIG. 1) as the leader for the synchronous replication for the collection of data volumes, and as the upstream storage system for the asynchronous replication for the collection of data volumes. The handover process can be initiated by the handover control engine 114 of FIG. 1, for example.

The process 500 includes after the handover process, identifying (at 506), using translation information, a data storage object already asynchronously replicated to the third storage system from the first storage system prior to the handover process, and resuming (at 508) the asynchronous replication for the collection of data volumes based on the identified data storage object.

A storage medium (e.g., 300 in FIG. 3 or 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a first storage system to:
   as part of a handover process from a second storage system to the first storage system, receive a transfer of both a synchronous replication role and an asynchronous replication role of the second storage system to the first storage system, wherein prior to the transfer both a synchronous replication according to the synchronous replication role and an asynchronous replication according to the asynchronous replication role were active at the second storage system, and wherein in the synchronous replication role the second storage system is to synchronously replicate data to the first storage system, and in the asynchronous replication role the second storage system is to asynchronously replicate a first data storage object to a third storage system different from the first storage system;
   in response to the transfer, perform, at the first storage system, both:
      synchronous replication according to the synchronous replication role of data from the first storage system to the second storage system or another storage system, and
      asynchronous replication according to the asynchronous replication role of data from the first storage system to the third storage system;
   as part of performing the asynchronous replication at the first storage system following the transfer:
      access translation information that translates between a first identifier of the first data storage object used by the first storage system and a different second identifier of the first data storage object, wherein the translation information includes multiple mapping entries, wherein each mapping entry of the translation information translates between an identifier of identifiers of respective data storage objects used by the first storage system and an identifier of corresponding different identifiers of the respective data storage objects used by the third storage system,
      use, at the first storage system, the translation information to identify a second data storage object that was subject to a pending asynchronous replication at the second storage system prior to the handover process, and
      asynchronously replicate, based on the identifying, the second data storage object from the first storage system to the third storage system.

2. The non-transitory machine-readable storage medium of claim 1, wherein the second data storage object is a copy of the first data storage object synchronously replicated from the second storage system to the first storage system prior to the transfer.

3. The non-transitory machine-readable storage medium of claim 1, wherein the identifying of the second data storage object that was subject to the pending asynchronous replication at the second storage system prior to the handover process is parte system to identify which data storage objects were asynchronously replicated from the second storage system to the third storage system prior to the handover process and which other data storage objects were subject to pending asynchronous operations at the second storage system prior to the handover process but were not asynchronously replicated from the second storage system to the third storage system.

4. The non-transitory machine-readable storage medium of claim 1, wherein the handover process designates the first storage system as a leader storage system for performing the synchronous replication and an upstream storage system for performing the asynchronous replication.

5. The non-transitory machine-readable storage medium of claim 1, wherein the instructions upon execution cause the first storage system to:
   use the translation information to determine that a third data storage object was previously asynchronously replicated to the third storage system from the second storage system; and
   determine to resume an asynchronous replication of data storage objects from the first storage system to the third storage system starting from the second data storage object created after the third data storage object.

6. The non-transitory machine-readable storage medium of claim 5, wherein the instructions upon execution cause the first storage system to:
   determine to not asynchronously replicate the third data storage object to the third storage system based on determining that the third data storage object was previously asynchronously replicated to the third storage system.

7. The non-transitory machine-readable storage medium of claim 5, wherein the instructions upon execution cause the first storage system to:
   after the transfer, send, to the third storage system, information identifying data storage objects at the first storage system; and
   receive, from the third storage system, an indication of whether any of the data storage objects identified by the information is stored at the third storage system,
   wherein the determining that the third data storage object was previously asynchronously replicated to the third storage system is based on the indication.

8. The non-transitory machine-readable storage medium of claim 1, wherein the instructions upon execution cause the first storage system to:
   as part of asynchronously replicating the second data storage object from the first storage system to the third storage system:
      translate, at the first storage system using the translation information, an identifier of the second data storage object used at the first storage system to an intermediate identifier, and send the intermediate identifier to the third storage system, the intermediate identifier useable at the third storage system to translate the intermediate identifier to an identifier of the second data storage object used at the third storage system, wherein the identifier of the second data storage object used at the first storage system is different from the identifier of the second data storage object used at the third storage system.

9. A first storage system comprising:
a processor; and
a non-transitory storage medium comprising instructions executable on the processor to:
  while the first storage system has a partner role for a second storage system having a leader role, receive a synchronous replication of a first data storage object from the second storage system; and
  as part of a handover process from the second storage system to the first storage system, receive a transfer of both a synchronous replication role and an asynchronous replication role of the second storage system to the first storage system, wherein prior to the transfer both a synchronous replication according to the synchronous replication role and an asynchronous replication according to the asynchronous replication role were active at the second storage system, and wherein in the synchronous replication role the second storage system is to synchronously replicate data to the first storage system, and in the asynchronous replication role the second storage system is to asynchronously replicate data to a third storage system different from the first storage system,
  in response to the transfer, perform, at the first storage system, both:
    synchronous replication according to the synchronous replication role of data from the first storage system to the second storage system or another storage system, and
    asynchronous replication according to the asynchronous replication role of data from the first storage system to the third storage system;
  as part of performing the asynchronous replication at the first storage system following the transfer:
    identify, using translation information, a second data storage object that was subject to a pending asynchronous replication at the second storage system prior to the handover process, wherein the translation information translates between a first identifier of the second data storage object used by the first storage system and a different second identifier of the second data storage object used by the third storage system, the translation information including multiple mapping entries, wherein each mapping entry of the translation information translates between an identifier of identifiers of respective data storage objects used by the first storage system and an identifier of corresponding different identifiers of the respective data storage objects used by the third storage system, and
    asynchronously replicate, based on the identifying, the second data storage object from the first storage system to the third storage system.

10. The first storage system of claim 9, wherein the identifying of the second data storage object that was subject to the pending asynchronous replication at the second storage system prior to the handover process is part of a process of the first storage system to identify which data storage objects were asynchronously replicated from the second storage system to the third storage system prior to the handover process and which other data storage objects were subject to pending asynchronous operations at the second storage system prior to the handover process but were not asynchronously replicated from the second storage system to the third storage system.

11. The first storage system of claim 9, wherein the handover process is initiated for maintenance or repair of the second storage system.

12. The first storage system of claim 9, wherein the synchronous replication performed at the first storage system is of data for a collection of data volumes, and the asynchronous replication performed at the first storage system is of data for the collection of data volumes.

13. The first storage system of claim 9, wherein the instructions are executable on the processor to:
  in association with the synchronous replication of the first data storage object, receive metadata for the first data storage object, wherein the metadata includes information indicating that asynchronous replication is to be performed for the first data storage object.

14. The first storage system of claim 13, wherein the instructions are executable on the processor to:
  receive an intermediate identifier of the first data storage object from the second storage system, the intermediate identifier translated from a first local identifier of the first data storage object by the second storage system; and
  generate a second local identifier of the first data storage object used by the first storage system, the second local identifier being different from the first local identifier.

15. The first storage system of claim 14, wherein the instructions are executable on the processor to:
  add an entry to the translation information, the entry correlating the intermediate identifier to the second local identifier of the first data storage object.

16. The first storage system of claim 9, wherein the instructions are executable on the processor to:
  create a third data storage object at the first storage system; and
  asynchronously replicate the third data storage object to the third storage system.

17. A method of a first storage system, comprising:
  as part of a handover process from a second storage system to the first storage system, receiving, at the first storage system, a transfer of both a synchronous replication role and an asynchronous replication role of the second storage system to the first storage system, wherein prior to the transfer both a synchronous replication according to the synchronous replication role and an asynchronous replication according to the asynchronous replication role were active at the second storage system, and wherein in the synchronous replication role the second storage system is to synchronously replicate data to the first storage system, and in the asynchronous replication role the second storage system is to asynchronously replicate a first data storage object to a third storage system different from the first storage system;
  in response to the transfer, performing, at the first storage system, both:
    synchronous replication according to the synchronous replication role of data from the first storage system to the second storage system or another storage system, and asynchronous replication according to the asynchronous replication role of data from the first storage system to the third storage system;

as part of performing the asynchronous replication at the first storage system following the transfer:

accessing translation information that translates between first identifiers of respective data storage objects used by the first storage system and corresponding different second identifiers of the respective data storage objects used by the third storage system, the translation information including multiple mapping entries, wherein each mapping entry of the translation information translates between an identifier of the identifiers of the respective data storage objects used by the first storage system and an identifier of the corresponding different second identifiers of the respective data storage objects used by the third storage system, using, at the first storage system, the translation information to identify a second data storage object that was subject to a pending asynchronous replication at the second storage system prior to the handover process, and asynchronously replicating, based on the identifying, the second data storage object from the first storage system to the third storage system.

18. The method of claim 17, wherein the identified second data storage object is a data snapshot created at the second storage system prior to the handover process.

* * * * *